(12) United States Patent
Dadashikelayeh et al.

(10) Patent No.: US 9,660,859 B1
(45) Date of Patent: May 23, 2017

(54) METHODS AND SYSTEMS FOR QUANTUM READY COMPUTATIONS ON THE CLOUD

(71) Applicant: 1QB Information Technologies Inc., Vancouver (CA)

(72) Inventors: Majid Dadashikelayeh, Vancouver (CA); Lester Szeto, Vancouver (CA)

(73) Assignee: 1QB INFORMATION TECHNOLOGIES INC., Vancouver, BC (CA)

( * ) Notice: Subject to any disclaimer, the term of this patent is extended or adjusted under 35 U.S.C. 154(b) by 0 days.

(21) Appl. No.: 15/349,519

(22) Filed: Nov. 11, 2016

Related U.S. Application Data

(63) Continuation of application No. 15/181,247, filed on Jun. 13, 2016, now Pat. No. 9,537,953.

(51) Int. Cl.
*H04L 12/24* (2006.01)
*G06F 17/30* (2006.01)
*G06N 99/00* (2010.01)
*H04L 29/06* (2006.01)

(52) U.S. Cl.
CPC ...... *H04L 41/046* (2013.01); *G06F 17/30864* (2013.01); *G06N 99/002* (2013.01); *H04L 63/20* (2013.01)

(58) Field of Classification Search
CPC ............. H04L 63/1425; H04L 63/1441; H04L 2463/141; H04L 63/1483; H04L 63/1416; H04L 67/306; H04L 29/06; H04L 63/0227; H04L 63/1408; G06F 21/55; G06F 21/577; G06F 9/505; G06N 3/0472
See application file for complete search history.

(56) References Cited

U.S. PATENT DOCUMENTS

| | | |
|---|---|---|
| 7,660,533 B1 | 2/2010 | Meyers et al. |
| 8,219,605 B2 | 7/2012 | Cowlishaw et al. |
| 8,230,432 B2 | 7/2012 | Bryant et al. |

(Continued)

FOREIGN PATENT DOCUMENTS

CA    2881033 A1    4/2015

OTHER PUBLICATIONS

Anthony et al. Quadratization of symmetric pseudo-Boolean functions. Discrete Appl. Math. 203:1-12 (2016).

(Continued)

*Primary Examiner* — Sargon Nano
(74) *Attorney, Agent, or Firm* — Wilson Sonsini Goodrich & Rosati

(57) ABSTRACT

The present disclosure provides methods, systems, and media for allowing access to quantum computers in a distributed computing environment (e.g., the cloud). Such methods and systems may provide optimization and computational services on the cloud. Methods and systems of the present disclosure may enable quantum computing to be relatively and readily scaled across various types of quantum computers and users at various locations, in some cases without the need for users to have a deep understanding of the resources, implementation or the knowledge that may be required for solving optimization problems using a quantum computer. Systems provided herein may include user interfaces that enable users to perform data analysis in a distributed computing environment while taking advantage of quantum technology in the backend.

30 Claims, 5 Drawing Sheets

(56) References Cited

U.S. PATENT DOCUMENTS

| | | | |
|---|---|---|---|
| 8,244,662 | B2 | 8/2012 | Coury et al. |
| 8,503,885 | B2 | 8/2013 | Meyers et al. |
| 8,655,828 | B2 | 2/2014 | Rose |
| 2003/0121028 | A1 | 6/2003 | Coury et al. |
| 2004/0267916 | A1 | 12/2004 | Chambliss et al. |
| 2006/0221978 | A1 | 10/2006 | Venkatachalam |
| 2006/0225165 | A1 | 10/2006 | Maassen et al. |
| 2008/0218519 | A1 | 9/2008 | Coury et al. |
| 2009/0325694 | A1* | 12/2009 | Beckman ............... A63F 13/10 463/31 |
| 2012/0278374 | A1 | 11/2012 | Cowlishaw et al. |
| 2012/0326720 | A1 | 12/2012 | Gambetta et al. |
| 2013/0308956 | A1 | 11/2013 | Meyers et al. |
| 2014/0122702 | A1* | 5/2014 | Jung ............... H04L 43/0876 709/224 |
| 2014/0123325 | A1* | 5/2014 | Jung ............... G06F 21/6254 726/30 |
| 2014/0258730 | A1* | 9/2014 | Stecher ............ G06F 21/6209 713/189 |
| 2014/0379924 | A1* | 12/2014 | Das ................... H04L 47/72 709/226 |
| 2015/0120551 | A1* | 4/2015 | Jung ............... G06Q 20/3224 705/44 |
| 2015/0120555 | A1* | 4/2015 | Jung ............... G06Q 20/40 705/44 |
| 2015/0169746 | A1* | 6/2015 | Hatami-Hanza .. G06F 17/30713 706/18 |
| 2015/0178349 | A1* | 6/2015 | Niewodniczanski ............... G06F 17/30424 707/722 |
| 2015/0220852 | A1* | 8/2015 | Hatami-Hanza ... G06Q 30/0207 706/12 |
| 2015/0227559 | A1* | 8/2015 | Hatami-Hanza .. G06F 17/30292 707/748 |
| 2015/0349960 | A1* | 12/2015 | Bagley ............... H04L 9/3242 713/168 |
| 2015/0358251 | A1* | 12/2015 | Varga ............... H04L 47/78 709/226 |
| 2016/0171368 | A1 | 6/2016 | Aspuru-Guzik et al. |
| 2016/0224515 | A1 | 8/2016 | Ronagh et al. |

OTHER PUBLICATIONS

Cai et al. A practical heuristic for finding graph minors.arXiv:1406.2741 [quant-ph] (16 pgs).
Co-pending U.S. Appl. No. 15/165,655, filed May 26, 2016.
Co-pending U.S. Appl. No. 15/181,247, filed Jun. 13, 2016.
Farhi et al. Quantum Adiabatic Evolution Algorithms versus Simlated Annealing. arXiv:quant-ph/0201031 pp. 1-16 (2002).
Ishikawa. Transformation of General Binary MRF Minimization to the First-Order Case. IEEE Transactions on Pattern Analysis and Machine Intelligence. 33(6):1234-1249 (2011).
Karimi et al. A subgradient approach for constrained binary programming via quantum adiabatic evolution. arXiv preprint arXiv:1605.09462 (16 pgs.) (2016).
Martinis et al. Rabi oscillations in a large Josephson-junction qubit. Physical Review Letters 89:117901 (2002).
Mcgeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available athttp://www.cs.amherst.edu/ccm/cf14-mcgeoch.pdf (11 pgs) (May 14-16, 2013).
Metz. IBM is now Letting Anyone Play With its Quantum Computer. WIRED. (5 pgs.) (May 2016).
Ronagh et al. Solving constrained quadratic binary problems via quantum adiabatic evolution. arXiv preprint arXiv:1509.05001 (20 pgs.) (2015).
SymPy Python. Internals of the Polynomial Manupulation Module. Available online at http://docs.sympy.org/latest/modules/polys/internals.html (Accessed Jun. 2016) (136 pgs).
The D-Wave 2X™ Quantum Compute Technology Overview (12 pgs) (2015).
U.S. Appl. No. 15/165,655 1st Action Interview dated Oct. 25, 2016.
Van Dam et al. How powerful is adiabatic quantum computation Proceedings 42nd IEEE Symposium on Foundations of Computer Science (pp. 279-287) (Oct. 2001).
U.S. Appl. No. 15/165,655 1st Action Interview dated Feb. 24, 2017.

* cited by examiner

METHODS AND SYSTEMS FOR QUANTUM READY COMPUTATIONS ON THE CLOUD

CROSS-REFERENCE

This application is a continuation of U.S. application Ser. No. 15/181,247, filed Jun. 13, 2016, the content of which is hereby incorporated herein by reference in its entirety.

BACKGROUND

Quantum computers typically make use of quantum-mechanical phenomena, such as superposition and entanglement, to perform operations on data. Quantum computers may be different from digital electronic computers based on transistors. For instance, whereas digital computers require data to be encoded into binary digits (bits), each of which is always in one of two definite states (0 or 1), quantum computation uses quantum bits (qubits), which can be in superpositions of states.

SUMMARY

Systems and methods disclosed herein relate to quantum information processing. The computational capability of a quantum computer is much more powerful than conventional digital computers. Quantum mechanics is now being used to construct a new generation of computers that can solve the most complex scientific problems—and unlock every digital vault in the world. Such quantum computers can perform a computation in a time period (e.g., seconds) that may be significantly less than a time period of a conventional computer to perform the computation. However, the cost of quantum information processing is extremely high. To make quantum computing more accessible to general populations, a new computational infrastructure integrating quantum computers and digital computers is necessary.

Access to quantum computing resources is expensive. Therefore, a new system disclosed herein allows shared access to quantum computing resources. A purpose of the system disclosed herein is to provide quantum computing services (e.g., optimization) on a cloud computing platform. The quantum computing services based on today's technologies are with the potential to add others as they are developed. Using a software development kit, users are not required to have a deep understanding of the internal architectures and mechanisms of quantum computing resources, implementation or the knowledge required for solving optimization problems using a quantum computer. The system disclosed herein may provide user interfaces for data analysis services on the cloud while taking advantage of quantum technology in the backend.

Systems and methods disclosed herein are able to improve the quality of computing services with much greater capability, flexibility and affordable costs. Scalable quantum computers disclosed herein may be complementary to digital computers wherein special-purpose computing resources are programmed or configured for certain classes of problems. Users in need of quantum computing services for their specific computing problems can access quantum-computing resources remotely, such as on the cloud. Users can run algorithms and experiments on quantum computers and processors working with individual quantum bits (qubits). Users may not be required to understand the internal architecture and mechanisms of quantum computing resources. Users' different familiarities with the issues and relevant solutions in their respective practices, such as, for example, weather forecasting, financial analysis, cryptography, logistical planning, search for Earth-like planets, and drug discovery, etc. may provide them the flexibility of accessing different quantum computing resources with methods and systems of the present disclosure. The quantum computing services on the cloud can provide significantly faster service than digital computers.

Systems and methods provided herein may improve the functioning of a quantum computer, such as, for example, by providing remote access to the quantum computer and facilitating the manner in which requests are processed. This can enable quantum computing to be scaled across multiple users at various locations.

The present disclosure provides methods and systems that enable ready access to a quantum computer. Such access may be remote access or local access. The quantum computer may be accessed over a network, such as through a cloud-based interface.

In one aspect, disclosed herein is a computing system for providing a service (e.g., web-based service, mobile service, or a computational service on any computing architecture) that allows manual and programmatic access to quantum computing resources or quantum-ready optimization, the computing system comprising a digital computer operatively coupled to a quantum computer remotely or over a network, wherein the quantum computer is configured to perform one or more algorithms, wherein the digital computer comprises at least one computer processor and computer memory, wherein the computer memory includes a computer program with instructions executable by the at least one computer processor to render an application to facilitate communication with the quantum computer, the computing system comprising: (a) a gateway programmed to receive a request over the network, wherein the request comprises a computational task; (b) a queuing unit programmed to place the request in a queue; (c) a cluster manager programmed to create a worker to (1) translate the request in the queue into quantum machine instructions, (2) deliver the quantum machine instructions to the quantum computer over the network to perform the computational task, and (3) receive one or more solutions from the quantum computer; (d) one or more databases programmed to temporarily or permanently store one or more of the following: the request, a user of the request, a dataset contained in the request, timestamps, the one or more solutions, a previously solved problem, a previously derived solution, session information, system operation information, routing information, auditing information, and diagnostic information. The previously solved problem or the previously derived solution is associated with the request. In some embodiments, the gateway may be further programmed to authenticate a use of the system. The gateway may be further programmed to monitor or enforce system and data security. The gateway may be further programmed to route the request to one of the at least one digital processor. The gateway may be further programmed to monitor data traffic. In some embodiments, the worker may be further programmed to divide the computational task into two or more computational components. A computational component may be corresponding to a quantum algorithm. A computational component is translated to the one or more of the quantum algorithms. A computational component may be translated to the quantum machine instructions. Translating to the quantum machine instructions may comprise determination of a number of qubits. Translating to the quantum machine instructions may comprise determination of a quantum operator. A computational component may be executed by the quantum computer sequentially or in parallel or both thereof. The cluster manager may be programmed to aggregate solutions of the two or more computational components. In some embodiments, the cluster manager may be programmed to control a start and a termination of the computational task. The cluster manager may be programmed to monitor a lifetime of the computational task. The one or more databases may be programmed to store a data set contained in the request. The database may be programmed to perform scalable persistent data storage. The queuing unit may be programmed to reorder the request in the queue, or maintain an order of the request in the queue. In some embodiments, the queuing unit may be programmed to prevent message loss. In some embodiments, the log comprises a timestamp of the event. Examples of the one or more quantum algorithms include, but are not limited to, a quantum optimization algorithm, a quantum transform, a quantum Fourier transform, an amplitude amplification, a quantum walk, or a combination thereof. The quantum computer may be an adiabatic quantum computer or any type of quantum computer. The computing system may comprise a logging unit programmed to record log, wherein the log comprises a timestamp, an event, a serialized snapshot of computations, and diagnostic information. The computing system may further comprise an application programming interface (API), wherein the API provides a programming model and hides architectural and technological details of the quantum computer from the API users, and wherein the API maintains unchanged when architecture of the quantum computer is changed. The API may be usable for various different architecture of the quantum computer. The system may comprise a serialization unit programmed to communicate a computational problem associated with the request from a user to the quantum computer and communicate a computed solution from the quantum computer back to the user.

In another aspect, disclosed herein is a non-transitory computer-readable medium comprising instructions executable by a digital processor to render an application for providing a service (e.g., web-based service, mobile service, or a computational service on any computing architecture) that allows manual and programmatic access to quantum computing resources of a quantum computer remotely or over a network, wherein the quantum computer is configured to perform one or more algorithms, the application comprising: (a) a gateway programmed to receive a request over the network, wherein the request comprises a computational task; (b) a queuing unit programmed to place the request in a queue; (c) a cluster manager programmed to create a worker to (1) translate the request in the queue into quantum machine instructions, (2) deliver the quantum machine instructions to the quantum computer over the network to perform the computational task, and (3) receive one or more solutions from the quantum computer for storage in a database; and (d) one or more databases programmed to temporarily or permanently store one or more of the following: the request, a user of the request, a dataset contained in the request, timestamps, the one or more solutions, a previously solved problem, a previously derived solution, session information, system operation information, routing information, auditing information, and diagnostic information. In some embodiments, the gateway may be further programmed to authenticate a use of the system. The gateway may be further programmed to monitor or enforce system and data security. The gateway may be further programmed to route the request to one of the at least one digital processor. The gateway may be further programmed to monitor data traffic. The previously solved problem or the previously derived solution is associated with the request. In some embodiments, the worker may be further programmed to divide the computational task into two or more computational components. A computational component may be corresponding to a quantum algorithm. A computational component may be translated to the one or more of the quantum algorithms. A computational component may be translated to the quantum machine instructions. Translating to the quantum machine instructions may comprise determination of a number of qubits. Translating to the quantum machine instructions may comprise determination of a quantum operator. A computational component may be executed by the quantum computer sequentially or in parallel or both thereof. The cluster manager may be programmed to aggregate solutions of the two or more computational components. In some embodiments, the cluster manager may be programmed to control a start and a termination of the computational task. The cluster manager may be programmed to monitor a lifetime of the computational task. The one or more databases may be programmed to store a data set contained in the request. The database may be programmed to perform scalable persistent data storage. The queuing unit may be programmed to reorder the request in the queue, or maintain an order of the request in the queue. In some embodiments, the queuing unit may be programmed to prevent message loss. In some embodiments, the log comprises a timestamp of the event. The one or more quantum algorithms may comprise a quantum optimization algorithm and/or a quantum transform. The one or more quantum algorithms may comprise a quantum Fourier transform. In some embodiments, the one or more quantum algorithms may comprise amplitude amplification. In some embodiments, the one or more quantum algorithms may comprise a quantum walk. The one or more quantum algorithms may comprise a quantum evolution. The quantum computer may be an adiabatic quantum computer, or any type of quantum computer. The media may comprise a logging unit programmed to record log, wherein the log comprises a timestamp, an event, a serialized snapshot of computations, and diagnostic information. The media may further comprise an application programming interface (API), wherein the API provides a programming model to hide architectural and technological details of the quantum computer and wherein the API maintains unchanged when architecture of the quantum computer is changed. The API may be usable for various different architecture of the quantum computer. The media may comprise a serialization unit programmed to communicate a computational problem associated with the request from a user to the quantum computer and communicate a computed solution from the quantum computer back to the user.

In another aspect, disclosed herein is a computer-implemented method of providing a service (e.g., web-based service, mobile service, or a computational service on any computing architecture) via a digital computer operatively coupled to a quantum computer remotely or over a network and allowing manual and programmatic access to quantum computing resources, wherein the quantum computer is configured to perform one or more algorithms, the method comprising: (a) receiving, by a processor, a request over the network, wherein the request comprises a computational task; (b) placing, by a processor, the request in a queue; (c) creating, by a processor, a worker to (1) translate the request in the queue into quantum machine instructions, (2) deliver the quantum machine instructions to the quantum computer over the network to perform the computational task, and (3)

receive one or more solutions from the quantum computer; and (d) temporarily or permanently storing, by a processor, one or more of the following: the request, a user of the request, a dataset contained in the request, timestamps, the one or more solutions, a previously solved problem, a previously derived solution, session information, system operation information, routing information, auditing information, and diagnostic information. In some embodiments, the method may further comprise authenticating, by a processor, use of the web-service. In some embodiments, the method may further comprise enforcing, by a processor, system and data security. In some embodiments, the method may further comprise routing, by a processor, the request to one of the at least one computer processor. In some embodiments, the method may further comprise monitoring, by a processor, data traffic. In some embodiments, the worker may be further programmed to divide the computational task into two or more computational components. In some embodiments, a computational component may be corresponding to a quantum algorithm or a classical algorithm. In some embodiments, a computational component may be translated to a quantum algorithm and quantum instructions. In some embodiments, the method may further comprise controlling, by a processor, start and termination of the computational task and monitoring a lifetime of the computational task. In some embodiments, the method may further comprise performing, by a processor, scalable persistent data storage. In some embodiments, the method may further comprise maintaining, by a processor, an order of the request in the queue and preventing message loss. In some embodiments, the method may further comprise recording, by a processor, log, wherein the log comprises a timestamp, an event, a serialized snapshot of computations, and diagnostic information. In some embodiments, the one or more algorithms comprise a quantum optimization algorithm and a quantum transform. In some embodiments, the method may further comprise creating, by a processor, an application programming interface (API), wherein the API provides a programming model, architectural and technological details of the quantum computer and wherein the API maintains unchanged when architecture of the quantum computer is changed. In some embodiments, the method may further comprise communicating, by a processor, a computational problem from a user to the quantum computer and communicating a computed solution from the quantum computer back to the user.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
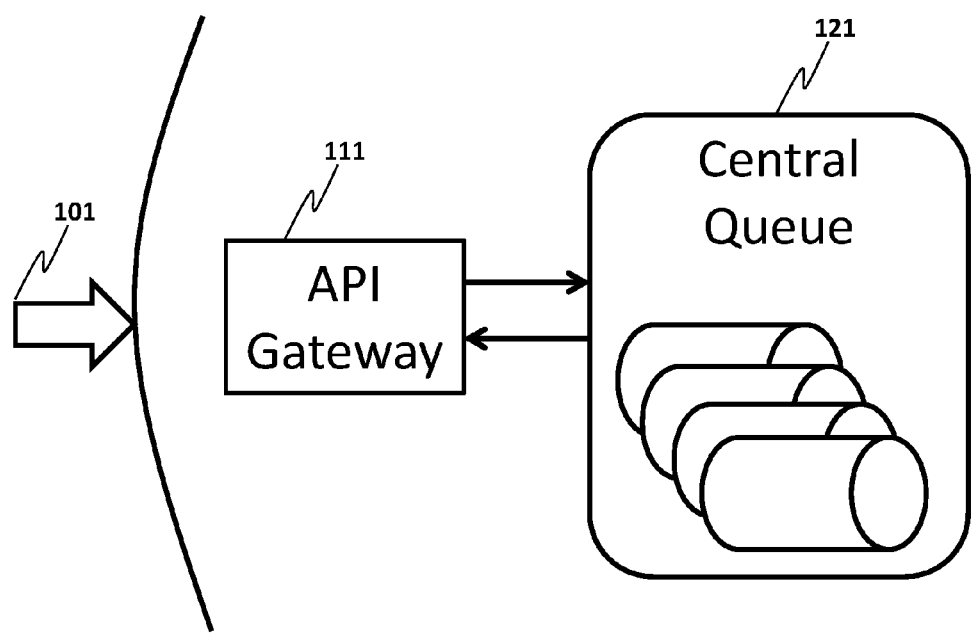
FIG. 1 shows a non-limiting example of an Application Program Interface (API) gateway and a queuing unit.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

The present disclosure provides systems and methods for facilitating quantum computing in a distributed environment, such as over a network (e.g., in the cloud). For example, a user at a first location may submit a request for a calculation or task to be performed by a quantum computer (e.g., adiabatic quantum computer) at a second location that is remotely located with respect to the first location. The request may be directed over a network to one or more computer servers, which subsequently direct a request to the quantum computer to perform the calculation or task.

Provided herein are systems and methods that provide optimization services in a distributed computing environment (e.g., the cloud), which may utilize quantum computing technology, such as an adiabatic quantum computer. Methods and systems of the present disclosure enable quantum computing to be relatively and readily scaled across various types of quantum computers and users in various locations, in some cases without the need for users to have a deep understanding of the resources, implementation or the knowledge required for solving optimization problems using a quantum computer. Systems provided herein may include user interfaces that enable users to perform data analysis in a distributed computing environment (e.g., in the cloud) while taking advantage of quantum technology in the backend.

In some embodiments, the systems, media, networks and methods include a quantum computer, or use of the same. Quantum computation uses quantum bits (qubits), which can be in superpositions of states. A quantum Turing machine is a theoretical model of such a computer, and is also known as the universal quantum computer. Quantum computers share theoretical similarities with non-deterministic and probabilistic computers.

In some embodiments, a quantum computer comprises one or more quantum processors. A quantum computer may be configured to perform one or more quantum algorithms. A quantum computer may be able to solve certain problems much more quickly than any classical computers that use even the best currently known algorithms, like integer factorization using Shor's algorithm or the simulation of quantum many-body systems. There exist quantum algorithms, such as Simon's algorithm, that run faster than any possible probabilistic classical algorithm. Examples of quantum algorithms include, but are not limited to, quantum optimization algorithms, quantum Fourier transforms, amplitude amplifications, quantum walk algorithms, and quantum evolution algorithms. Quantum computers may be able to efficiently solve problems that no classical computer would be able to solve within a reasonable amount of time. Thus, a system disclosed herein utilizes the merits of quantum computing resources to solve complex problems.

Any type of quantum computers may be suitable for the technologies disclosed herein. Examples of quantum computers include, but are not limited to, adiabatic quantum computers, quantum gate arrays, one-way quantum computer, topological quantum computers, quantum Turing machines, superconductor-based quantum computers, trapped ion quantum computers, optical lattices, quantum dot computers, spin-based quantum computers, spatial-based quantum computers, Loss-DiVincenzo quantum computers, nuclear magnetic resonance (NMR) based quantum computers, liquid-NMR quantum computers, solid state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, Bose-Einstein condensate-based quantum computers, transistor-based quantum computers, and rare-earth-metal-ion-doped inorganic crystal based quantum computers.

Access to quantum computing resources may be expensive or such quantum computing resources may be inaccessible given geographic limitations. The present disclosure provides systems and methods that may allow shared or distributed access to quantum computing resources. The disclosed system may provide quantum computing services (e.g., optimization based on quantum algorithms) on a cloud computing platform. Using a software development kit, users are not required to have a deep understanding of the quantum computing resources, implementation or the knowledge required for solving optimization problems using a quantum computer.

In an aspect, the present disclosure provides a system for quantum-ready optimization. The computing system may comprise a digital computer operatively coupled to a remote quantum computer over a network. The quantum computer may be configured to perform one or more quantum algorithms. The digital computer may comprise at least one computer processor and computer memory. The computer memory may include a computer program with instructions executable by the at least one computer processor to render an application. The application may facilitate use of the quantum computer by a user.

The system may include a gateway programmed to receive a request over the network. The request may include a computational task. Examples of a computational task include, but are not limited to, search, optimization, statistical analysis, modeling, data processing, etc. In some embodiments, a request may comprise a dataset; for example, a data matrix including variables and observations for creating a modeling or analyzing statistics of the data set. Further, a solution may be derived; for example, an optimal model underlying a given dataset is derived from a quantum computer; a statistical analysis is performed by a quantum computer.

The system may include a queuing unit programmed to store and order the request in one or more queues. The system may include a cluster manager programmed to create an instance/container (also "worker" herein) to (1) translate the request in the queue into one or more quantum machine instructions, (2) deliver the one or more quantum machine instructions to the quantum computer over the network to perform the computational task, and (3) receive one or more solutions from the quantum computer. The one or more solutions may be stored in a database of the system. The system may include a logging unit programmed to log an event of the worker.

The system may comprise an interface for a user. In some embodiments, the interface may comprise an application programming interface. The interface may provide a programmatic model that abstracts away the internal details (e.g., architecture and operations) of the quantum computer. In some embodiments, the interface may minimize the need to update the application programs in response to changing quantum hardware. In some embodiments, the interface may remain unchanged when the quantum computer has a change in internal structure.

Gateway

Systems, media, networks and methods of the present disclosure may include a gateway that may be programmed to receive a request from a user. The request may include a computational task. In some embodiments, the gateway is programmed to authenticate a user of the system. In some embodiments, the gateway is programmed to monitor system and data security. As an example, a gateway may use secure sockets layer (SSL) for encrypting requests and responses. In some embodiments, a gateway is programmed to route the request to one of the at least one digital processor. In some embodiments, a gateway is programmed to monitor data traffic.

In some embodiments, the systems, media, networks and methods include a queuing unit. In some embodiments, a queuing unit is programmed to place the request in the queue. When a queue comprises more than one request, the requests may be placed in order. The order may be based on first-in-first-out, or based on timing, or based on available quantum computing resources. In some embodiments, a queuing unit is further programmed to reorder the request in the queue. In some embodiments, a queuing unit is responsible for preventing message loss. The tasks submitted may be stored in the queue and are accessed in order by the microservices that need to work with them.

A gateway may be a microservice used for authentication, routing, security and monitoring purposes. Referring to FIG. 1, a request 101 is received by an application programming interface (API) gateway 111 and then forwarded through to one or more target microservices. In some embodiments when the target microservices are not available immediately, the request 101 may be first handled by a queuing unit 121 which places the request in a queue. In some cases, a request is pushed into the queue 121, or inserted into the queue 121. In some embodiments, a request in the queue 121 is reordered based on priorities of computational tasks. For instance, a new incoming request has a same computational task as the top queue; to save quantum computing resources, it may be better to have the new request being executed concurrently with the top queue, so the queuing unit allocates the new request as the top queue as well.

In some embodiments, the systems, media, networks and methods described herein include a database service, or use of the same. In some embodiments, a database is programmed to store a data set in the request. In some embodiments, a database in the microservices is in charge of storing persistent data. In some embodiments, solutions to solved problems are maintained by the database.

Figure 2:
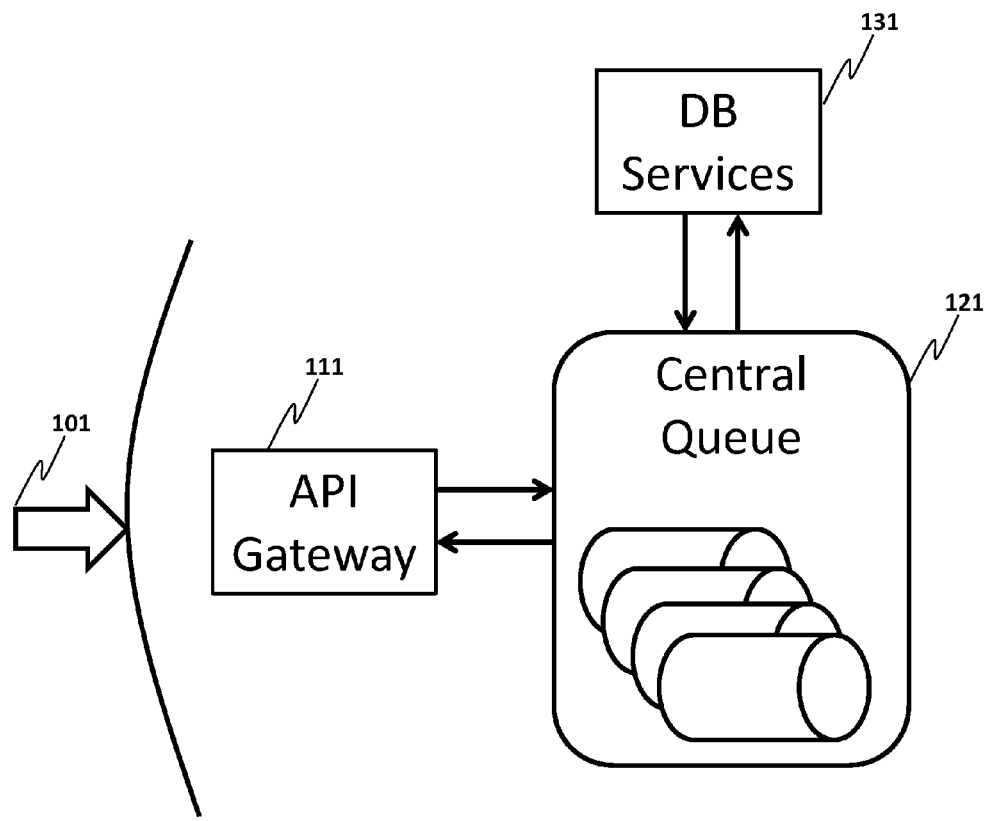
FIG. 2 shows a non-limiting example of an API gateway, a queuing unit and a database service.

Referring to FIG. 2, a database 131 communicates with the queuing unit 121. In some embodiments, status of a worker or a quantum computing resource (e.g., availabilities, reading, writing, queuing, algorithms to be executed, algorithms having been performed, timestamps) are stored in the database 131. In some cases, data sent along with a request is stored in the database 131 as well. Persistent data and solutions to solved tasks may be stored in the database 131.

In some embodiments, the quantum-ready system disclosed herein include one or more databases, or use of the same. Many databases may be suitable for storage and retrieval of application information. In some embodiments, suitable databases include, by way of non-limiting examples, relational databases, non-relational databases, object oriented databases, object databases, entity-relationship model databases, associative databases, and XML databases. In some embodiments, a database is internet-based. In some embodiments, a database is web-based. In some embodiments, a database is cloud computing-based. In other embodiments, a database is based on one or more local computer storage devices.

In some embodiments, a system may comprise a serialization unit for communicating problem instances from the user to the quantum computer through the gateway. On the other hand, the serialization unit is programmed to communicate computed solutions to those instances from the quantum computer back to the user through the gateway. The serialization mechanism may be based on JSON, XML, or other markup languages; however, an entirely new format for the serialization may be used herein. In some embodiments, the serialization mechanism may involve transmitting texts or binary files. In some embodiments, the serialization mechanism may or may not be encrypted. In some embodiments, the serialization mechanism may or may not be compressed.

In some embodiments, a system may comprise a user interface for a user to submit a request to solve a computational task. A user may specify the task and submit associated datasets. The user interface transmits the request and the datasets to the gateway. The gateway then processes the request based on the technologies disclosed herein. When solutions are derived by a quantum computer, the gateway may send a notification to the user. The user may retrieve the solutions via the user interface.

Cluster Manager

In some embodiments, the systems, media, networks and methods described herein include a cluster manager. The cluster manager may be programmed to translate the request to quantum machine instructions. In some embodiments, the cluster manager delivers the quantum machine instructions to a quantum processor to perform the computational task. In addition, the cluster manager receives one or more solutions from the quantum processor.

In some embodiments, a cluster manager is programmed to divide the computational task into two or more computational components. In some embodiments, a computational component is corresponding to a quantum algorithm. In some embodiments, the two or more computational components are translated to the one or more of the quantum algorithms, or translated to quantum machine instructions.

In some embodiments, translating to the quantum machine instructions comprises determination of a number of qubits and/or determination of a quantum operator. In some embodiments, two or more computational components are executed by the quantum computer sequentially or in parallel or both thereof.

In some embodiments, a cluster manager is programmed to aggregate solutions of the two or more computational components. In some embodiments, a cluster manager is further programmed to control a start and a termination of the computational task. Further, a cluster manager is programmed to monitor a lifetime of the computational task.

Figure 3:
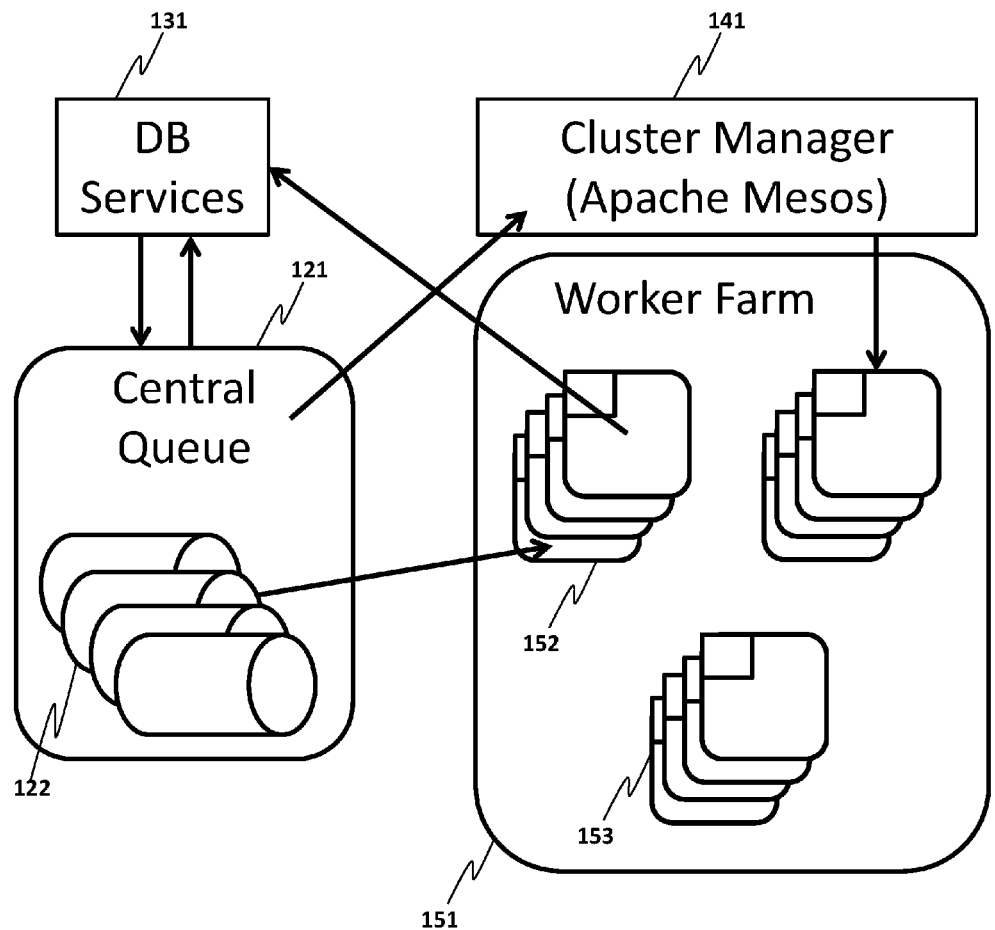
FIG. 3 shows a non-limiting example of a queuing unit, database service, and a cluster manager.

Referring to FIG. 3, the central queue 121 transmits the recent state of the queue to the cluster manager 141. In this example, the cluster manager 141 is realized by an Apache Mesos server. The cluster manager 141 starts and controls the lifetime of certain types of computational components. The cluster manager starts instances/containers (called workers) that are able to perform the operations (e.g., translating to specific quantum computing instructions, controlling quantum computers/processors 201 to execute computational tasks, etc.) required by the queue entries. For instance, a worker 152 is assigned to process a request 122. If the worker 152 is successful, it sends the result to the database service 131 and removes the entry 122 from the queue. The worker 152 is then destroyed to free up the resources for other operations in order to save costs.

In some embodiments, an algorithm specified in a request may comprise a classical or a quantum algorithm. A worker may determine if the classical algorithm or the quantum algorithm has to be translated into another classical algorithm or another quantum algorithm. Once a computational task in a request is translated into quantum machine instructions, the quantum machine instructions are transmitted to a quantum computer. The quantum computer may execute a classical algorithm or a quantum algorithm or both to complete a computational task.

Logging Unit

In some embodiments, the systems, media, networks and methods described herein include a logging unit, or use of the same. In some embodiments, a logging service is in charge of tracking the events occurring in separate microservices. All the microservices transmit a log of the events into the central logging microservice.

An event disclosed herein may be associated with any one or more of the following: a login into the system, submitting a request, processing the request, queuing the request, processing a computational task in the request, dividing the computational task, translating the computational task into a quantum algorithm and quantum instructions, transmitting quantum instructions to a quantum computer, performing computations by a quantum computer, computational steps in a quantum computer, transmitting a computational result/solution from a quantum computer to a server, and notifying a user the availability of the results/solutions.

In some embodiments, a logging unit is programmed to store a log, wherein the log comprises an event taking in the digital computer or the quantum processor. In some embodiments, a log comprises a timestamp of the event.

Figure 4:
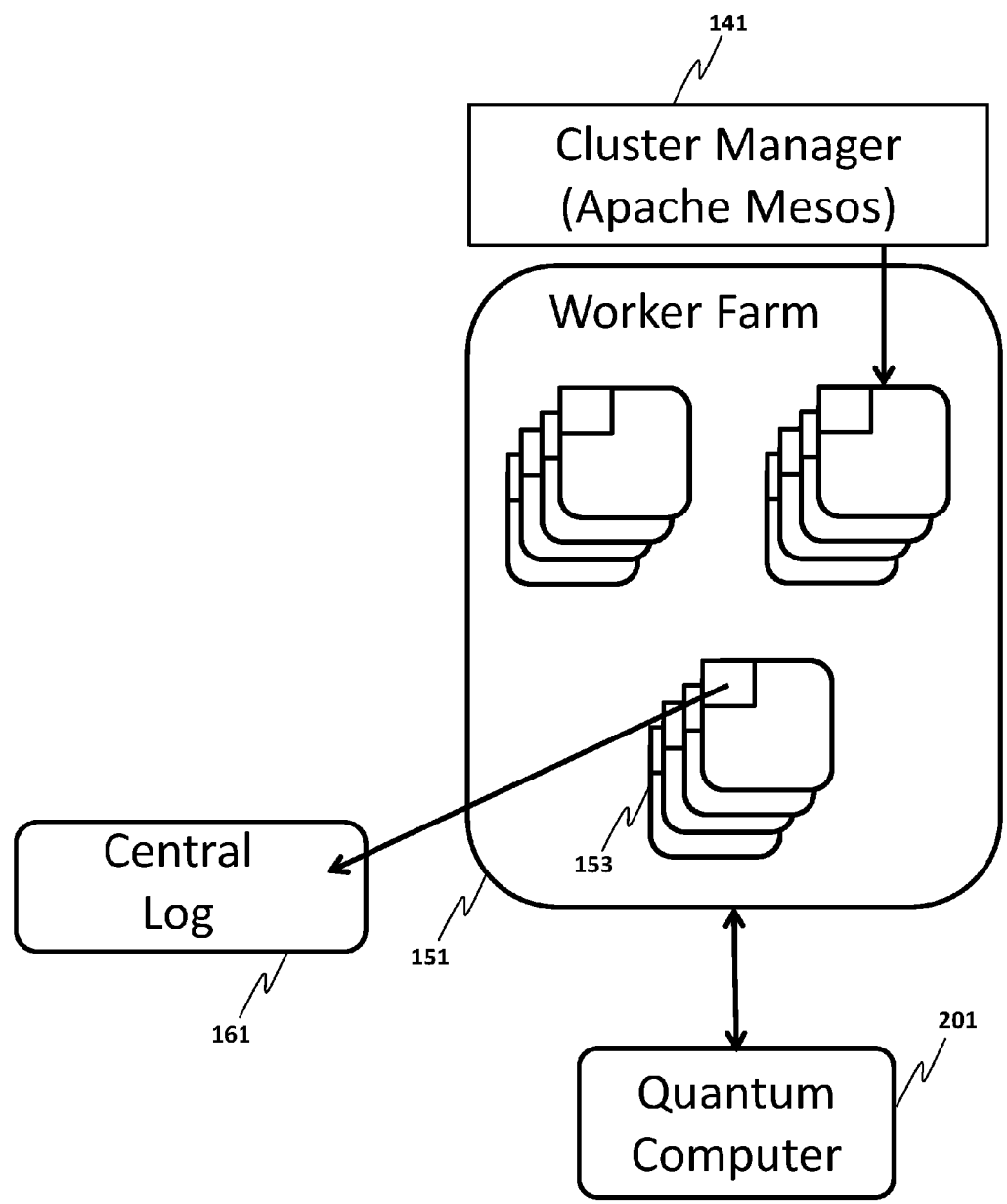
FIG. 4 shows a non-limiting example of a cluster manager and a logging unit.

Referring to FIG. 4, a logging unit 161 communicates with workers to record all the events. In this figure, the logging unit 161 communicates with a worker 153 to record the start, the steps and the end of computational tasks.

Digital Processing Device

In some embodiments, the systems, media, networks and methods described herein include digital processing device, or use of the same. In some embodiments, the digital processing device includes one or more hardware central processing units (CPU) that carry out the device's functions. In some embodiments, the digital processing device further comprises an operating system configured to perform executable instructions. In some embodiments, the digital processing device is connected a computer network. In some embodiments, the digital processing device is connected to the Internet such that it accesses the World Wide Web. In some embodiments, the digital processing device is connected to a cloud computing infrastructure. In some embodiments, the digital processing device is connected to an intranet. In some embodiments, the digital processing device is connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Smartphones may be suitable for use with methods and systems described herein. Select televisions, video players, and digital music players, in some cases with computer network connectivity, may be suitable for use in the system described herein. Suitable tablet computers may include those with booklet, slate, and convertible configurations.

In some embodiments, the digital processing device includes an operating system configured to perform executable instructions. The operating system is, for example, software, including programs and data, which manages the device's hardware and provides services for execution of applications. Suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Suitable media streaming device operating systems include, by way of non-limiting examples, Apple TV®, Roku®, Boxee®, Google TV®, Google Chromecast®, Amazon Fire®, and Samsung® HomeSync®. Suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In some embodiments, on OLED display is a passive-matrix OLED (PMOLED) or active-matrix OLED (AMOLED) display. In some embodiments, the display is a plasma display. In other embodiments, the display is a video projector. In some embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In some embodiments, the input device is a Kinect, Leap Motion, or the like. In some embodiments, the input device is a combination of devices such as those disclosed herein.

Non-Transitory Computer Readable Storage Medium

In some embodiments, the systems, media, networks and methods described herein include one or more non-transitory computer readable storage media encoded with a program including instructions executable by the operating system of an optionally networked digital processing device. In some embodiments, a computer readable storage medium is a tangible component of a digital processing device. In some embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, media, networks and methods described herein include at least one computer program, or use of the same. A computer program includes a sequence of instructions, executable in the digital processing device's CPU, written to perform a specified task. Computer readable instructions may be implemented as program units, such as functions, objects, Application Programming Interfaces (APIs), data structures, and the like, that perform particular tasks or implement particular data types (e.g., abstract data types). In light of the disclosure provided herein, a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In some embodiments, a computer program includes one or more software units. In some embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. A web application may utilize one or more software frameworks and one or more database systems. In some embodiments, a web application is created upon a software framework such as Microsoft NET or Ruby on Rails (RoR). In some embodiments, a web application utilizes one or more database systems including, by way of non-limiting examples, relational, non-relational, object oriented, associative, and XML database systems. In some embodiments, suitable relational database systems include, by way of non-limiting examples, Microsoft® SQL Server, mySQL™, and Oracle®. A web application may be written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In some embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

A mobile application may be created, for example, using hardware, languages, and development environments. Mobile applications may be written in various programming languages. Suitable programming languages include, by way of non-limiting examples, C, C++, C#, Obj ective-C, Java™, Javascript, Pascal, Object Pascal, Python™, Ruby, VB.NET, WML, and XHTML/HTML with or without CSS, or combinations thereof Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Several commercial forums may be available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Standalone applications may be compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins may enable customizing the functionality of a software application. For example, plug-ins are commonly used in web browsers to play video, generate interactivity, scan for viruses, and display particular file types. Web browser plug-ins include, without limitation, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

Several plug-in frameworks are available that may enable development of plug-ins in various programming languages, including, by way of non-limiting examples, C++, Delphi, Java™ PHP, Python™, and VB .NET, or combinations thereof.

Web browsers (also called Internet browsers) are software applications, which may be configured for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) may be configured for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the systems, media, networks and methods described herein include software, server, and/or database modules, or use of the same. Software modules may be created using various machines, software, and programming languages. The software modules disclosed herein are implemented in a multitude of ways. In some embodiments, a software module comprises a file, a section of code, a programming object, a programming structure, or combinations thereof. In some embodiments, a software module comprises a plurality of files, a plurality of sections of code, a plurality of programming objects, a plurality of programming structures, or combinations thereof. In some embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In some embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the software applications, systems, and methods described herein and are not meant to be limiting.

Example 1

Computing Architecture

Figure 5:
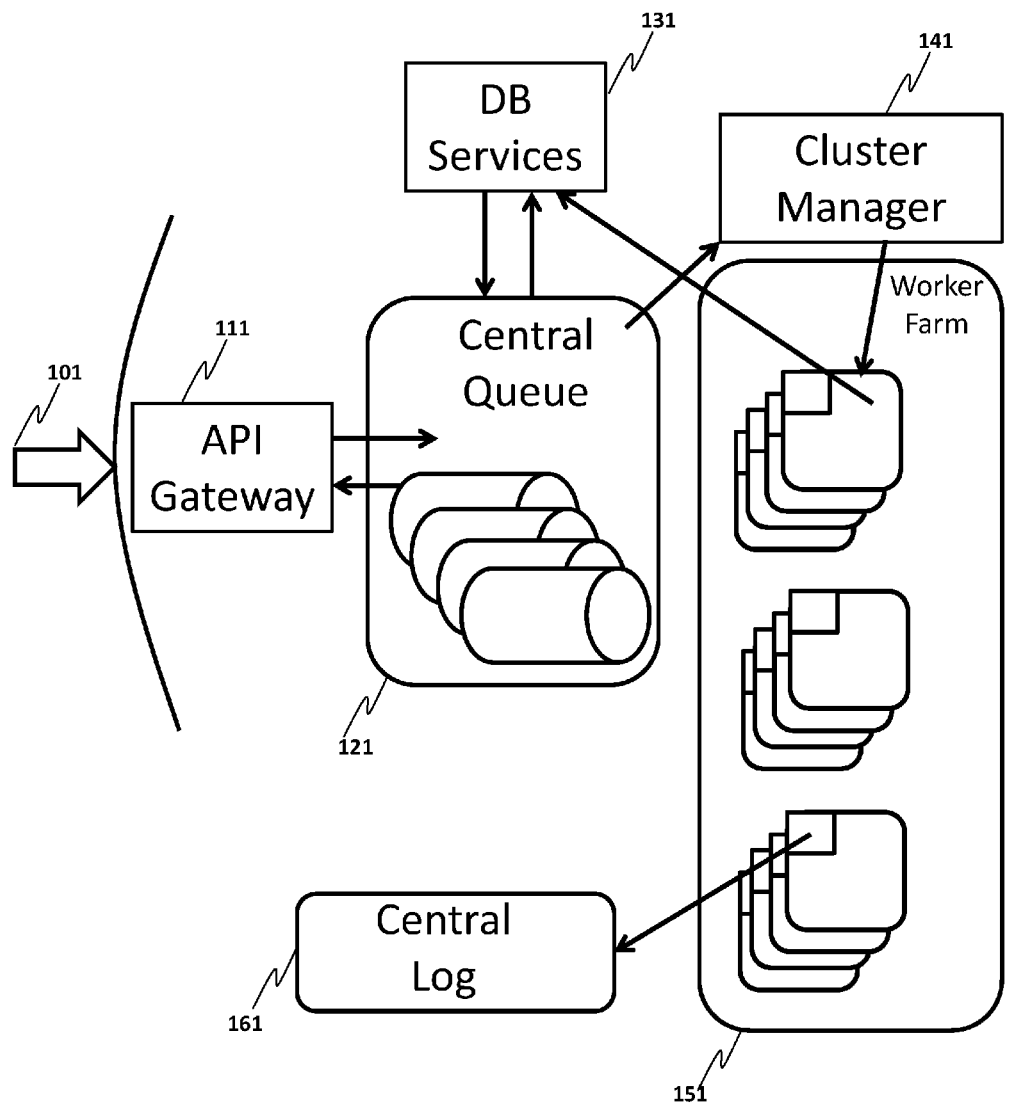
FIG. 5 shows a non-limiting example of a computing architecture of a cloud platform for accessing shared quantum computing resources.

FIG. 5 shows a non-limiting example of a computing architecture of the system. A request 101 comprising computational tasks is transmitted to an API gateway 111. The request 101 is first handled by a queuing unit 121 which places the request in a queue. A database 131 communicates with the queuing unit 121 to record status and transactions of queues. The queuing unit 121 further transmits the recent state of the queue to the cluster manager 141. In this example, the cluster manager 141 is realized by an Apache Mesos server. The cluster manager 141 starts and controls the lifetime of certain types of computational components. The cluster manager 141 starts workers in worker farm 151 to perform integrated digital and quantum computations, such as translating to specific quantum computing instructions and controlling digital and quantum processors to execute computational tasks. A worker completing its assigned tasks is then destroyed by the cluster manager 141. A logging unit 161 communicates with workers to record all the events.

Systems and methods of the present disclosure may be combined with or modified by other systems and methods, such as, for example, those described in U.S. Patent Pub. No. 2012/0326720 and U.S. Patent Pub. No. 2006/0225165; Farhi, Edward, et al. "Quantum computation by adiabatic evolution." arXiv preprint quant-ph/0001106 (2000); and Van Dam, Wim, Michele Mosca, and Umesh Vazirani, "How powerful is adiabatic quantum computation?", Foundations of Computer Science, 2001, Proceedings, 42nd IEEE Symposium on IEEE (2001), each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computing system that provides a digital computer with cloud accesses to a computing:
platform comprising at least one quantum computer over a network, wherein said digital computer comprises at least one computer processor and computer memory comprising a computer program executable by said at least one computer processor to generate a request, and wherein said computing platform comprising said at least one quantum computer is configured to execute one or more instructions in response to said request to generate one or more solutions, said computing system comprising:
a cloud-based interface that is configured to receive said request from said digital computer over said network;
a cluster manager configured to (i) in response to said request, provide said one or more instructions for delivery to said computing platform comprising said at least one quantum computer, which computing platform comprising said at least one quantum computer executes said one or more instructions to generate said one or more solutions, and (ii) receive said one or more solutions generated by said computing platform comprising said at least one quantum computer; and
one or more databases that are configured to store said one or more solutions generated by said computing platform comprising said at least one quantum computer.

2. The computing system of claim 1, further comprising a gateway that is configured to perform one or more of authenticating a user of said digital computer, enforcing system and data security, receiving said request from said digital computer, and monitoring data traffic.

3. The computing system of claim 1, wherein said cluster manager is configured generate or terminate said one or more instructions, or monitor a lifetime of said one or more instructions.

4. The computing system of claim 1, further comprising a queuing unit that is configured to place said request in a queue.

5. The computing system of claim 4, wherein said queuing unit is configured to maintain an order of said request in said queue.

6. The computing system of claim 1, further comprising a logging unit configured to record a log associated with said request, wherein said log comprises at least one of a timestamp, an event associated with said request, a serialized snapshot of computations, and diagnostic information.

7. The computing system of claim 1, further comprising an application programming interface (API) that is usable for different architectures of said computing platform comprising said at least one quantum computer.

8. The computing system of claim 7, wherein said API hides architectural or technological details of said computing platform comprising said at least one quantum computer.

9. The computing system of claim 1, further comprising a serialization unit configured to serially communicate (i) a computational problem associated with said request to said computing platform comprising said at least one quantum computer, or (ii) said one or more solutions from said computing platform comprising said at least one quantum computer to said digital computer.

10. The computing system of claim 1, wherein said one or more instructions comprise a quantum algorithm.

11. The computing system of claim 1, wherein said cloud-based interface is configured to provide said one or more solutions to said digital computer.

12. The computing system of claim 1, wherein said at least one quantum computer comprises a plurality of quantum computers.

13. The computing system of claim 12, wherein said one or more instructions comprise a plurality of instructions and said one or more solutions comprise a plurality of solutions, and wherein said cluster manager provides said plurality of instructions for delivery to said computing platform comprising said plurality of quantum computers, which computing platform comprising said plurality of quantum computers executes said plurality of instructions to generate said plurality solutions.

14. The computing system of claim 1, wherein said digital computer is a personal computer.

15. The computing system of claim 1, wherein said computing platform comprises at least one digital processor.

16. A computer-implemented method for providing a digital computer with cloud accesses to a computing platform comprising at least one quantum computer over a network, wherein said digital computer comprises at least one computer processor and computer memory comprising a computer program executable by said at least one computer processor to generate a request, and wherein said computing platform comprising said at least one quantum computer is configured to execute one or more instructions in response to said request to generate one or more solutions, said method comprising:

(a) using a cloud-based interface to receive said request from said digital computer over said network;

(b) in response to said request, providing said one or more instructions for delivery to said computing platform comprising said at least one quantum computer, which computing platform comprising said at least one quantum computer executes said one or more instructions to generate said one or more solutions;

(c) receiving said one or more solutions generated by said computing platform comprising said at least one quantum computer; and (d) storing said one or more solutions generated by said computing platform comprising said at least one quantum computer in one or more databases.

17. The method of claim 16, further comprising one or more of authenticating a user of said digital computer, enforcing system and data security, receiving said request from said at least one computer processor, and monitoring data traffic.

18. The method of claim 16, further comprising generating or terminating said one or more instructions, or monitoring a lifetime of said one or more instructions.

19. The method of claim 16, further comprising, prior to (b), placing said request in a queue.

20. The method of claim 19, further comprising maintaining an order of said request in said queue.

21. The method of claim 16, further comprising recording a log associated with said request, wherein said log comprises at least one of a timestamp, an event associated with said request, a serialized snapshot of computations, and diagnostic information.

22. The method of claim 16, wherein said one or more instructions comprise a quantum algorithm.

23. The method of claim 16, further comprising creating an application programming interface (API), wherein said API is usable for different architectures of said computing platform comprising said at least one quantum computer.

24. The method of claim 16, further comprising serially communicating (i) a computational problem associated with said request to said computing platform comprising said at least one quantum computer, or (ii) said one or more solutions from said computing platform comprising said at least one quantum computer to said digital computer.

25. The method of claim 16, further comprising using said cloud-based interface to provide said one or more solutions to said digital computer.

26. The method of claim 16, wherein said at least one quantum computer comprises a plurality of quantum computers.

27. The method of claim 26, wherein said one or more instructions comprise a plurality of instructions and said one or more solutions comprise a plurality of solutions, and wherein said plurality of instructions are delivered to said computing platform comprising said plurality of quantum computers, which computing platform comprising said plurality of quantum computers executes said plurality of instructions to generate said plurality solutions.

28. The method of claim 16, wherein said digital computer is a personal computer.

29. The method of claim 16, wherein said computing platform comprises at least one digital processor.

30. A non-transitory computer-readable medium comprising machine-executable code that, upon execution, implements a method for providing a digital computer with cloud accesses to a computing platform comprising at least one quantum computer over a network, wherein said digital computer comprises at least one computer processor and computer memory comprising a computer program executable by said at least one computer processor to generate a request, and wherein said computing platform comprising said at least one quantum computer is configured to execute one or more instructions in response to said request to generate one or more solutions, said method comprising:
- (a) using a cloud-based interface to receive said request from said digital computer over said network;
- (b) in response to said request, providing said one or more instructions for delivery to said computing platform comprising said at least one quantum computer, which computing platform comprising said at least quantum computer executes said one or more instructions to generate said one or more solutions;
- (c) receiving said one or more solutions generated by said computing platform comprising said at least one quantum computer; and
- (d) storing said one or more solutions generated by said computing platform comprising said at least one quantum computer in one or more databases.

* * * * *